Inventors
Louis Gelfand &
Robert Francis McLean
By Willits, Helmig & Baillio
Attorneys United States Patent Office 2,763,508
Patented Sept. 18, 1956

2,763,508

VEHICLE WINDOW REGULATOR

Louis Gelfand, Detroit, and Robert F. McLean, Oak Park, Mich., assignors to General Motors Corporation, Detroit, Mich., a corporation of Delaware Application June 28, 1952, Serial No. 296,212

14 Claims. (Cl. 296—44)

The present invention relates to automobile window regulating means and, more particularly, to means for raising and lowering windows of compound curvature construction.

The window regulating means presently employed on motor vehicles requires that the window to be moved be a flat pane of transparent material which is mounted so that it must slide in a substantially vertical plane. Since the body of a vehicle is made up of a series of compound curved surfaces, the use of a flat window necessitates a break or discontinuity in the exterior contour. Such a discontinuity is objectionable from a styling standpoint, and it also places a severe limitation on the shapes that may be employed in designing an automobile. The raising and lowering of a flat window in close proximity to the curved doors or body of an automobile presents several problems. In installations where a flat vertical pane of glass is to be lowered into the well of a door or other curved section of a car body, it is necessary that the said well be of sufficient breadth to accommodate the window pane. If the window is inclined in an effort to move it into the arcuate portions of the car body, the base of the door or other section must be objectionably wide in order to accommodate the window when in its fully closed position.

An additional problem in windows of this nature is the establishment of a dust and water-tight seal between the sliding window and the car body. The most widely adopted solution to this problem is to place a strip of resilient sealing material such as rubber or felt in the guiding channels for the window. However, when there is enough pressure between the window and the channel to create an effective seal, there is not only a large frictional drag, but the seal is soon worn so that it becomes ineffective.

One object of the present invention is to provide a window regulating means which is capable of raising and lowering a compound curved window in such a manner that its path of movement conforms substantially with the curved contour of the vehicle.

A further object is to provide, in a device of the stated character, an effective seal between the window and the car body which will be subject to a minimum of wear.

A still further object is to provide guide means for a slidable window having novel anti-rattle means associated therewith.

A more specific object is to provide a motor operated window regulating means for actuating arcuate automobile windows to open and close position, said means including a plurality of curved guide rails for causing said windows to move in curved paths in substantial conformity with the curvature of the car body at all times and also to move laterally as they approach the fully closed position to effect a seal between said windows and the car body.

These and other objects and advantages will become more apparent as the description of the invention progresses.

Figures 2, 3, 4:
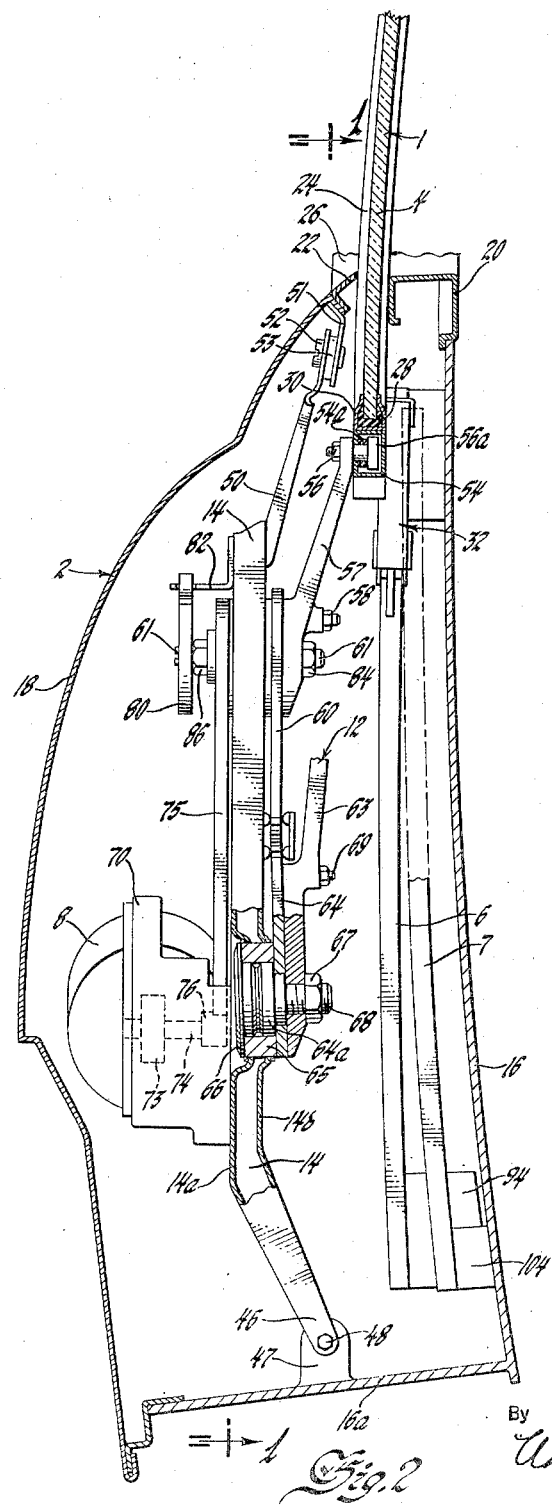
Fig. 2 is a sectional elevational view taken substantially along line 2—2 of Fig. 1, portions of the device being broken away to show the structure of certain parts thereof.
Fig. 3 is a sectional elevational view of a fragmentary portion of the window and regulating means therefor taken substantially along line 3—3 of Fig. 1.
Fig. 4 is a sectional view of one of the guide rollers, said view being taken substantially along line 4—4 of Fig. 1.

Referring to the drawings in more detail, the numeral 1 designates generally a compound curved glass automobile window slidably mounted within a vehicle door 2. The window pane 4 travels along the path of a pair of spaced, curved guide rails 6 and 7 and is raised and lowered by means of an electric motor 8 through a gear train 10 and a lever mechanism 12 mounted on a frame 14 which in turn is suitably supported in the interior of the door 2. Door 2 may be of any suitable construction and in the present instance comprises a fabricated structure including an L-shaped inner panel 16, a formed sheet metal outer panel 18, an inner sill 20 and an outer sill 22, all of which are secured in position as shown in Fig. 2 by any suitable means such as by welding.

The window panel 4 has provided around the perimeter thereof a decorative frame 24 which is adapted to tightly engage a vertical guide 26 when the window is in the fully raised or closed position. The lower edge of the window panel 4 has secured thereto a rubber sealing strip 28 which is seated in a U-shaped channel 30. Channel 30 has secured thereto near the ends thereof a pair of longitudinally spaced, downwardly extending brackets 32 and 34 which are adapted to travel along the guide rails 6 and 7. The front bracket 32 comprises a relatively flat plate 33 which projects forwardly of the window panel in a substantially vertical plane, and has rotatably mounted thereon a pair of rollers or wheels 36 which engage and travel along the opposite edges of the forward guide rail 6. A strip 38 extends between the mounting means for rollers 36 and forms a support for a pair of spring loaded rollers or wheels 39 which also engage and travel along the opposite edges of forward rail 6. Each roller 39 is connected to strip 38 by an arm 40 and coil springs 41 urge said rollers into engagement with rail 6. In order to minimize or eliminate rattling of the window the rollers 36 may be constructed of a resilient material such as synthetic polymeric amides which is sold commercially under the trade name of nylon. As shown in Fig. 4, each roller 36 comprises an outer annular ring 36a constructed of nylon having an annular groove 36b provided therein which engages a rounded edge of forward guide rail 6. Mounted inwardly and in telescopic relation with nylon ring 36a are a brass ring 36c, a rubber ring 36d and a bearing ring 36e. These rings are press fitted into the position shown in Fig. 4. Bearing ring 36e receives a pin 36f which in turn is secured to the bifurcations 32a and 32b of bracket 32. Each roller 36 is thus freely rotatable on a pin 36f and held snugly in engagement with an edge of guide rail 6 by the springs 41 and the other associated connections previously described. It will be apparent that other specific forms of rollers may be provided if desired without departing from the invention. For example the entire roller 36 may be constructed of nylon or but a single liner may be employed as desired. It has been found that nylon contains certain resilient properties which enable some compression thereof. This produces a cushioning effect as the rollers 36 travel along rail 6 thereby insuring quiet operation as well as preventing rattle of the parts. In the specific roller structure shown in Fig. 4, the rubber ring 36d also produces a cushioning effect during operation of the rollers along rail 6. The springs 41 may also be so tensioned as to urge the rollers 39 against the rail 6 with sufficient force to prevent intermittent disengagement thereof with rail 6 thus greatly reducing any vibratory motion of window 1.

The rear bracket 34 projects downwardly from the channel 30 and has integral therewith a transverse flange 42. Rollers 43, 44 and 45 are mounted on flange 42 in any suitable manner and are arranged in spaced staggered relation. Roller 44 engages the inner side of rail 7 while rollers 43 and 45 engage the opposite side of said rail to effectively guide window 4 during opening and closing movements thereof. The rollers 43, 44 and 45 preferably may be constructed of resilient material to eliminate rattling and other objectionable noise. The surface material employed on rollers 43, 44 and 45 may be of any suitable composition such as rubber, but nylon has been found to be preferable. By employing rollers which operate on the opposite faces of the rear rail 7, the window 4 may be moved in a fore and aft direction during its vertical travel as will presently appear.

The frame 14 may be fabricated in any suitable manner, however, it is desirable to have the frame as rigid as possible to ensure that the gears in gear train 10 mounted thereon will remain in mesh at all times. In the present instance the frame 14 includes a pair of spaced walls 14a and 14b and is supported by a pair of spaced downwardly extending legs 46. The legs 46 are pivotally mounted on supporting ears 47 secured to and projecting from the lower leg 16a of L-shaped panel 16 by means of bolts 48. The upwardly extending arm 50 of frame 14 is attached to a bracket 51 secured to and depending from sill 22 by means of a bolt or machine screw 52. Arm 50 is slidably mounted on bolt 52 in order to permit the frame 14 to rock about its pivot support 48 during movement of the window to raised and lowered positions. A rubber or other cushioning member 53 is disposed between arm 50 and bracket 51 to prevent rattle. If desired, a spring or other means may be used in place of member 53.

Both the front and rear barckets 32 and 34 have secured thereto in substantially parallel relationship C-shaped channels or tracks 54 and 55. The head 56a of bolt 56 mounted on the outer end of a window operating arm 57 slidably engages the channel 54. A pliable washer 54a, such as leather, is mounted on the shank of bolt 56 and lies between the head 56a thereof and one side of channel 54 to prevent rattle or other objectionable noise. The inner end of arm 57 is secured by means of bolts 58 to a gear segment 60. Segment 60 is secured to a shaft 61 journaled in any suitable bearings provided in the spaced walls 14a and 14b of frame 14. Track 55 also slidably receives the head 62a of a bolt 62 mounted near the outer end of a second window operating arm 63 secured to a second gear segment 64. Segment 64 meshes with segment 60 and has an enlarged journal portion 64a secured thereto which is mounted in bearings 65 provided in the spaced walls 14a and 14b of frame 14. Segment 64 is held in position by a disk 66 integral with journal 64a which engages one side of bearing 65 and by a nut 67 mounted on the threaded shanks 68 of journal portion 64a which engages the inner side of arm 63. The shank 68 and nut 67 constitute one point of attachment of arm 63 to segment 64, the other being a bolt 69. The sector gears 60 and 64 are of similar construction and when operated by motor 8 cause simultaneous movement of arms 57 and 63.

Electric motor 8 is secured in any suitable manner to a gear housing 70 which in turn may be secured by bolts or other means to frame 14. The shaft 71 of motor 8 has secured thereto a worm 72 which meshes with a worm wheel 73. Worm wheel 73 has secured thereto a shaft 74 which is journaled in any suitable bearings provided in gear casing 70. A small pinion 76 which is secured to shaft 74 meshes with a large gear segment 75 secured to shaft 61 which, it will be remembered, is also secured to gear segment 60. It therefore is seen that upon operation of motor 8 in one direction, gear segments 60 and 64 will swing window operating arms 57 and 63 upwardly to actuate window 4 to closed position and when operated in the reverse direction said gear segments will swing arms 57 and 63 downwardly to actuate the window to open position. The movement of window 4 is counter-balanced by a spring 80. The inner end of spring 80 is secured in a slot provided in the outer end of shaft 61 while the outer end of said spring is attached to a bracket 82 secured to frame 14. It will also be observed that segments 75 and 60 are held in position by nuts 84 and 86 engaging the threaded ends of shaft 61.

The curvature of guide rails 6 and 7 determines the path of travel of the window as it ascends and descends. The forward rail 6 is supported in spaced relation with panel 16 by a pair of supporting brackets 92 and 94 which in turn are rigidly fastened to said panel by suitable means such as screws 96. Brackets 92 and 94 may be of any suitable construction so long as they do not interfere with the rollers 36 and 39 during movement of the window to its different positions of adjustment. The front rail 6 is provided with offset portions 98 near the upper end thereof which cause the window assembly to move slightly forward when it approaches its fully closed position. Frictional drag and wear normally resulting from sliding contact between the sealing material 100 and the window frame 24 is eliminated by this construction and yet an effective seal is provided by tightly pressing the edge of the window against the sealing material 100. The rear rail 7 is also secured in spaced relation with panel 16 by a pair of brackets 102 and 104. Brackets 102 and 104 may be secured to channel 16 in any suitable manner such as by screws 105 and may be of any desired construction so long as they do not interfere with the window 4 or the rear rollers 43, 44 and 45 during movement of said window to its different positions of adjustment.

Figure 1:
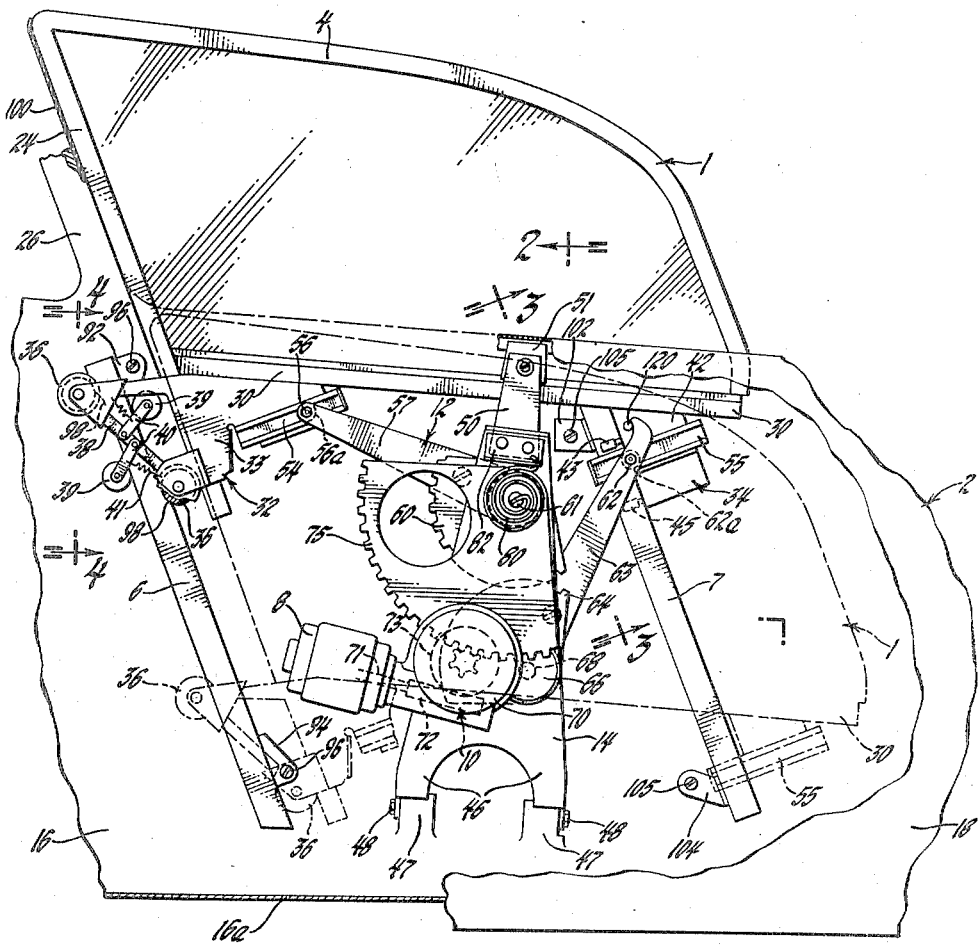
Fig. 1 is a side elevational view, partly in section, of a vehicle door showing the window regulating means embodying the present invention, parts of the door panel being broken away to more clearly show certain features thereof.

Any suitable electric circuit and switch means not shown may be provided for the control of electric motor 8, as, for example, that shown in the co-pending application of Garvey et al. Serial No. 244,784, filed September 1, 1951, to which reference may be had for a full disclosure thereof. In order to raise window panel 4 from the position shown in broken lines in Fig. 1, electric motor 8 is energized by closing the proper switch. Motor 8 then operates gear segments 60 and 64 through gears 72 and 73, shaft 74, pinion 76, segment 75 and shaft 61 causing arms 57 and 63 to swing upwardly to effect an upward movement of window panel 4. As the panel 4 ascends the front rollers 36 and 39 and the rear rollers 43, 44 and 45 travel upwardly along the curved or arcuate guide rails 6 and 7 and thereby cause the said window panel to also move in an arcuate path as defined by the said rails. In the embodiment of the invention shown the rails 6 and 7 are so curved that the window 4 will remain substantially in parallel or concentric relationship with the general contour of the portion of the vehicle body laying adjacent thereto as said window is raised and lowered.

As the front and rear rollers travel along the rails 6 and 7, the curvature thereof will cause the C-shaped channels 54 and 55, and cause consequently the lower end of the window panel 4, to move in a direction substantially perpendicular to the plane of travel during vertical movement of said panel. Since the heads of bolts 56 and 62 are restrained by the guide channels 54 and 55 they are adapted only for sliding movement therealong. Consequently, arms 57 and 63 will be compelled to move toward the tracks 6 and 7, during vertical movement of window panel 4. This movement is permitted by virtue of the sliding connection of arm 50 of frame 14 on bolt 52 which enables frame 14, as well as all elements mounted thereon, including arms 57 and 63, to swing inwardly slightly against the action of resilient member 53.

The movement of window 4 may be stopped in any position between fully open and fully closed position by opening the said control switch (not shown) thereby interrupting the circuit to motor 8. When the window is moved to the fully raised or closed position the front guide wheels 36 engage the offset portions 98 of the front rail 6 thereby urging the window forward a distance corresponding to the amount of offset. Since the rear rollers 43, 44 and 45 travel on the face of the rail 7 rather than along the edges thereof, they are free to slide fore and aft on said rail and thus will not interfere with the forward motion of the window panel 4. It, therefore, is apparent that as window 4 is raised and lowered the portion of the frame 24 provided on the forward edge thereof will travel in close proximity to the door guide frame 26 without actually coming into contact therewith. This not only reduces wear on the sealing material 100 but by forcing the window panel 4 tightly against the door frame 26 and compressing the sealing material 100 therein, a greatly improved weather seal is obtained. Conversely, when the window is lowered the wheels 36 will travel over the offset and cam the sealing material 100 away from frame 26 thus leaving the window 1 free to descend without frictionally engaging the sealing material 100. In order to limit the upward motion of the window 4 and thereby prevent damage to the associated parts, a stop 120 is mounted on the rear bracket 34. When the window reaches its fully closed position, the rear lifting arm 63 will strike the stop 120 thereby preventing any further upward motion.

It will be apparent that the embodiment of the invention herein described is subject to modification and change without departing from the spirit thereof. While the invention has been shown as applied to a window mounted in a vehicle door, it is apparent that it is equally applicable to windows mounted elsewhere on the vehicle or other devices. It, therefore, is to be understood that it is not intended to limit the invention to the embodiment disclosed herein but only by the claims which follow.

Having thus described the invention, what is hereby claimed as new and desired to be secured by United States Letters Patent is:

We claim:

1. In an automobile door having a window opening therein and a well for receiving a curved slidable window, substantially vertically disposed arcuate guide rail means mounted in said well, means carried by said window and engaging the opposite sides of said guide rail means compelling said window to travel along said rail means, additional guide means, means carried by said window engaging said last mentioned guide means, sealing means provided in said door along one side of said window opening, means on said last mentioned guide means for causing said window to move longitudinally into engagement with said sealing means as said window approaches its closed position of adjustment and to move away from said sealing means upon its initial movement toward open position, and actuating means for said window.

2. In a structure having a window opening and a window receiving well provided therein, a curved window adapted for substantially vertical movement to open and close said opening, guide rail means mounted on said structure and having a curvature generally similar to that of said window, means carried by said window engaging the opposite sides of said guide rail means for compelling said window to travel along said rail means, hinge means on said structure, supporting means carried by said hinge means, operating means carried by said supporting means for moving said window to open and closed positions, said hinge means allowing said supporting means and said operating means to move normal to the plane of said guide rail means during movement of said window toward open and closed positions, and resilient means for resisting the movement of said supporting means in one direction.

3. In a structure having a window opening and a window receiving well provided therein, a curved window adapted for substantially vertical movement to open and close said opening, a first curved guide rail mounted in said well, anti-friction means carried by said window engaging the opposite sides of said guide rail for compelling said window to travel along said rail, a second curved guide rail, anti-friction means carried by said window and engaging the opposite edges of said rail to compel said window to travel in an arcuate path similar to said guide rails, operating means for moving said window to open and closed positions, and a frame pivotally mounted in said well for supporting said operating means, whereby said operating means may move substantially normal to the plane of said rails during movement of said window toward opened and closed positions to compensate for the curvature of said guide rails.

4. In a structure having a window opening and a window receiving well provided therein, a curved window adapted for substantially vertical movement to open and close said opening, a first curved guide rail mounted in said well, anti-friction means carried by said window engaging the opposite sides of said guide rail for compelling said window to travel along said rail, a second curved guide rail, anti-friction means carried by said window and engaging the opposite sides of said rail, operating means for moving said window to open and closed positions, a frame pivotally mounted in said well for supporting said operating means, whereby said operating means may move normal to said rails during movement of said window towards the opened and closed positions to compensate for the curvature of said guide rails, said second rail having an opposite offset substantially parallel edge portion near the upper end thereof, thereby changing the direction of movement of said window as it approaches its closed position of adjustment.

5. In a structure having a window opening and a window receiving well provided therein, a curved window adapted for substantially vertical movement to open and close said opening, a first curved guide rail mounted in said well, anti-friction means carried by said window engaging the opposite sides of said guide rail for compelling said window to travel along said rail, a second curved guide rail, anti-friction means carried by said window and engaging the opposite sides of said rail, operating means for moving said window to open and closed positions, a frame pivotally mounted in said well for supporting said operating means, whereby said operating means may move normal to said rails during movement of said window towards the opened and closed positions to compensate for the curvature of said guide rails, sealing means provided in said structure along one wall of said window opening, and offset substantially parallel portions on said second guide rail near the upper end thereof for causing said window to move longitudinally into engagement with said sealing means as said window approaches its closed position and to move away from said sealing means during its movement toward opened position thereby reducing the wear on said sealing means to a minimum.

6. In a structure having a window opening and a window receiving well provided therein, a window for movement between said opening and said well, a guide rail for guiding the window during movement thereof to open and closed positions, anti-friction rollers carried by said window each of said rollers being constructed at least in part of a synthetic polymeric amide commonly known as nylon, each of said rollers having a peripheral portion with an annular groove provided therein for receiving an edge of said rail, a bearing member in the center of said roller for rotatably supporting said rollers on said window, and a resilient intermediate portion disposed between said peripheral portion and said bearing member.

7. In an automobile door having a window opening therein, a window adapted for movement into and out of said opening, arcuate guide means mounted on said door, anti-friction means carried by said window and engaging said guide means, actuating means hingedly mounted on said door for swinging movement relative thereto and being operatively connected to said window to move said window along said guide means into and out of said opening, said actuating means being adapted for movement substantially normal to the plane of said window.

8. In an automobile door having a window opening therein, a window adapted for movement into and out of said opening, a window receiving well provided in said door, at least one arcuate guide rail mounted in said well and being disposed substantially parallel to the line of movement of said window, anti-friction means carried by said window and engaging said guide rail to cause said window to move in a curved path similar to the shape of said guide rails, power actuating means movably mounted on said door for swinging movement relative thereto and being operatively connected to said window to move said window along said guide rails into and out of said opening, said power actuating means being adapted for movement substantially normal to said window as said window moves along said curved path.

9. In an automobile door having a window opening therein, and a well for receiving a curved window adapted for movement into and out of said opening, the combination of a pair of guide rails mounted in said well and being disposed substantially parallel to the line of movement of said window, anti-friction means carried by said window and engaging said guide rails to cause said window to move in a curved path similar to the guide rails, hinge means disposed in said well and supported by said door, power actuating means pivotally carried on said hinge and being adapted to swing normal to the plane of said window during movement of said window into and out of said opening.

10. In an automobile door having a window opening therein, and a well for receiving a curved window adapted for movement into and out of said opening, the combination of a pair of arcuate guide rails mounted in said well and being disposed substantially parallel to the line of movement of said window, anti-friction means carried by said window and engaging said guide rails to cause said window to move in a curved path similar to the shape of said guide rails, a frame hinged on said door for swinging movement normal to said window, power actuating means mounted on said frame for swinging movement therewith, said actuating means being operatively connected to said window to move said window along said guide rails into and out of said opening.

11. In an automobile door having a window opening therein, a window adapted for movement into and out of said opening, a pair of guide rails mounted on said door substantially parallel to the line of movement of said window, anti-friction means carried by said window and engaging said guide means, actuating means mounted on said door and operatively connected to said window to move said window along said guide means into and out of said opening, sealing means mounted on said door on the side of said opening and being disposed to receive said window, a laterally offset portion mounted on said guide means adjacent one end thereof, said portion being positioned to engage said anti-friction means when said window approaches the closed position for causing said window to move longitudinally into engagement with said sealing means as said window approaches the closed position and to move away from said sealing means upon its initial movement toward open position.

12. In an automobile having a window opening therein, a window adapted for movement into and out of said opening, sealing means disposed on a side of said opening to receive said window when in the closed position, guide means mounted on said automobile substantially parallel to the line of travel of said window, anti-friction means carried by said window and engaging said guide means, actuating means mounted on said automobile and operatively connected to said window to move said window along said guide means into and out of said opening, said guide means having a portion thereon positioned to engage said anti-friction member when said window approaches its closed position for causing said window to move longitudinally into engagement with said sealing means as it approaches the closed position and to move said window away from said sealing means upon its initial movement toward open position.

13. In an automobile door having a window opening therein, a curved window adapted for sliding movement into and out of said opening, a well in said door adapted to receive said window when disposed in the open position, sealing means on said door disposed along one side of said window opening to receive said window when in the closed position, a pair of arcuate guide rails mounted in said well substantially parallel to the line of travel of said window, two sets of anti-friction means carried by said window, each of said sets engaging one of said rails, and means for actuating said window for movement along said guide rails into and out of said opening, said anti-friction means being adapted to compel said window to travel in an arcuate path substantially similar to the shape of said guide rails during movement between the open and closed positions, at least one of said rails having an offset portion adjacent one end thereof which is positioned to engage said anti-friction means when said window approaches the closed position for causing said window to move longitudinally into engagement with said sealing means as said window approaches its closed position and to move away from said sealing means upon its initial movement towards open position.

14. A sound absorbent roller adapted to be rotatably carried on a window for resilient rolling engagement with a guide member during movement of said window, said roller having a rim constructed of a synthetic polymeric amide commercially known as nylon, said rim having an annular groove provided in the periphery thereof which is adapted for rolling engagement with said guide member, an anti-friction bearing disposed in the center of said roller and being adapted to be mounted on a shaft secured to said window, and an intermediate portion disposed between said bearing and said rim, said portion being constructed of a resilient material that will permit relative movement between said rim and said bearing.

References Cited in the file of this patent

UNITED STATES PATENTS

| | | |
|---|---|---|
| 1,713,088 | Nicholson | May 14, 1929 |
| 1,907,799 | Hardtke | May 9, 1933 |
| 1,928,056 | Holt et al. | Sept. 26, 1933 |
| 2,160,099 | Zeligman et al. | May 30, 1939 |
| 2,382,791 | Hill | Aug. 14, 1945 |
| 2,390,271 | Rappl et al. | Dec. 4, 1945 |
| 2,632,668 | Keller | Mar. 24, 1953 |

FOREIGN PATENTS

| | | |
|---|---|---|
| 646,562 | France | July 16, 1928 |
| 774,608 | France | Sept. 24, 1934 |

OTHER REFERENCES

Nylon in Bearings and Gears, Product Engineering, July 1950, pp. 102–107 inclusive.

Nylon Parts for Ball Bearings, Product Engineering, February 1952, pp. 119–123 inclusive.